United States Patent [19]

Raue et al.

[11] 4,349,670

[45] Sep. 14, 1982

[54] PROCESS FOR THE PREPARATION OF CATIONIC DYESTUFFS

[75] Inventors: Roderich Raue; Heinz Giesecke, both of Leverkusen, Fed. Rep. of Germany

[73] Assignee: Bayer Aktiengesellschaft, Leverkusen, Fed. Rep. of Germany

[21] Appl. No.: 169,580

[22] Filed: Jul. 17, 1980

[30] Foreign Application Priority Data

Aug. 4, 1979 [DE] Fed. Rep. of Germany ....... 2931772

[51] Int. Cl.$^3$ ................. C07D 211/72; C07D 215/06; C09B 55/00
[52] U.S. Cl. ..................................... 542/417; 542/419
[58] Field of Search ............................... 542/417, 419

[56] References Cited

U.S. PATENT DOCUMENTS

| | | | |
|---|---|---|---|
| 3,635,955 | 1/1972 | Hansen et al. | 542/417 |
| 3,973,903 | 8/1976 | Clarke | 8/659 |
| 4,026,885 | 5/1977 | Frey et al. | 542/417 |

FOREIGN PATENT DOCUMENTS 1544290  12/1976  United Kingdom .

Primary Examiner—Arthur P. Demers
Attorney, Agent, or Firm—Sprung, Horn, Kramer & Woods

[57] ABSTRACT

To prepare dyestuffs of the general formula

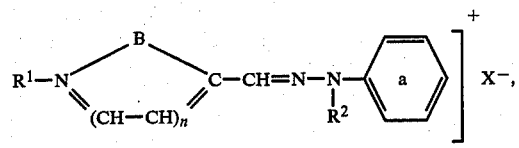

in which
R$^1$ and R$^2$ represent methyl or ethyl,
n represents 0 or 1,
B represents the divalent radical of a 5-membered or 6-membered heterocyclic ring system and
X$^-$ represents an anion,
and wherein
the ring a can be substituted by C$_1$- to C$_4$-alkyl radicals, C$_1$- to C$_4$-alkoxy radicals or halogen,
compounds of the formula

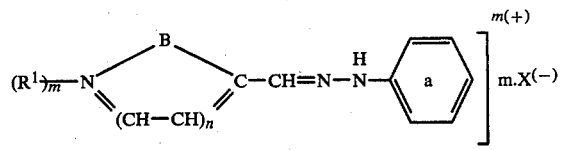

wherein
R$^1$, B and n have the meaning indicated above,
m represents 0 or 1 and
the ring a can be substituted by C$_1$- to C$_4$-alkyl, C$_1$- to C$_4$-alkoxy or halogen,
or of the formula

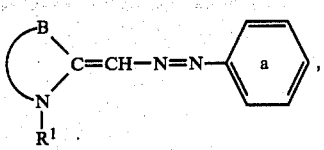

in which
B and R$^1$ have the abovementioned meaning and the ring a can be substituted by C$_1$- to C$_4$-alkyl, C$_1$- to C$_4$-alkoxy or halogen,
are reacted with arylsulphonic acid esters of the formula

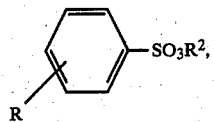

wherein
R represents hydrogen, C$_1$- to C$_4$-alkyl or halogen and
R$^2$ represents methyl or ethyl,
in the presence of water and acid-binding agents at temperatures of 20°–70° C., and, if appropriate, the arylsulphonate anion is replaced by another anion customary in dyestuff chemistry.

1 Claim, No Drawings

PROCESS FOR THE PREPARATION OF CATIONIC DYESTUFFS

A process for the preparation of cationic dyestuffs of the general formula

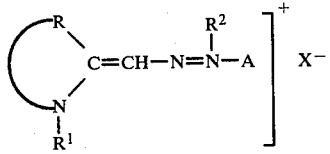   I wherein
R denotes the remaining constituent of a 5-membered or 6-membered heterocyclic ring,
$R^1$ denotes an alkyl, cycloalkyl, aralkyl or aryl radical,
$R^2$ denotes an alkyl, cycloalkyl or aralkyl radical,
A denotes an aromatic or heterocyclic radical and
X denotes an acid radical,
is known from German Patent Specification 1,083,000.

This process is characterised in that colour bases of the general formula

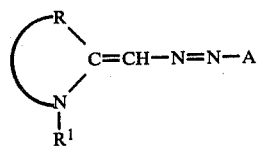   II wherein
R, $R^1$ and A have the meaning indicated for formula I,
are reacted with alkylating agents, the azo nitrogen bonded to the radical A being quaternised.

The preparation of dyestuffs of the general formula

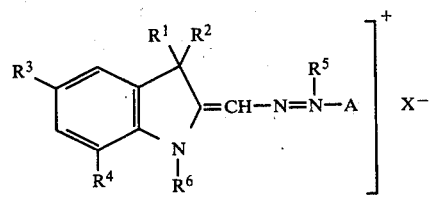   III wherein
A denotes the radical of an aromatic amine of the benzene or naphthalene series,
X denotes an anion,
$R^1$ and $R^2$ denote short-chain alkyl radicals which are identical or different or are bonded to one another,
$R^3$ and $R^4$ denote hydrogen or nonionic substituents and
$R^5$ and $R^6$ denote alkyl radicals,
by treating colour bases of the general formula

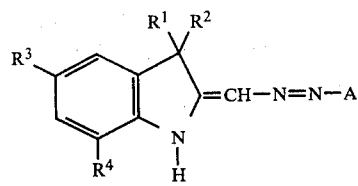   IV wherein
A, $R^1$, $R^2$, $R^3$ and $R^4$ have the meaning indicated for formula III,
with alkylating agents in the presence of acid-binding agents, is known from German Patent Specification No. 1,205,638. Both processes use organic solvents as the reaction medium, water essentially being excluded, in order to avoid saponification of dimethyl sulphate.

The methylation of these colour bases in the presence of particular tertiary amines is described in German Patent Specification No. 1,770,782, anhydrous organic solvents being employed in all the examples.

Methylation in the presence of water is described in German Offenlegungsschrift (German Published Specification) No. 2,509,622. However, an extremely large excess of dimethyl sulphate is required in this case (140–200% per mol of azo base).

Finally, a process for the alkylation of pyridinealdehyde phenylhydrazones in an aqueous medium at pH≧12 with dimethyl sulphate or diethyl sulphate at low temperatures is known from German Offenlegungsschrift (German Published Specification) No. 2,620,790.

All the processes which have hitherto been proposed for the preparation of cationic hydrazone dyestuffs in the presence of water utilise dimethyl sulphate or diethyl sulphate as the alkylating agent. Both alkylating agents have the disadvantage of being extremely readily saponifiable in an alkaline medium. Slight variations in the pH value or in the temperature can accelerate the saponification of the dialkyl sulphates to such an extent that it is impossible to achieve complete alkylation even if a large excess of the alkylating agent is present. Compared with the pure dyestuffs, the dyestuffs which are contaminated with the non-methylated colour salts have considerable disadvantages; for example, on materials of polyacylonitrile, they produce duller dyeings with a lower fastness to light and sublimation.

It has now been found that arylsulphonic acid methyl esters and ethyl esters do not have the disadvantage of being saponifiable under the reaction conditions to the same extent as the dialkyl sulphates. The invention relates to a process for the preparation of cationic hydrazone dyestuffs of the general formula

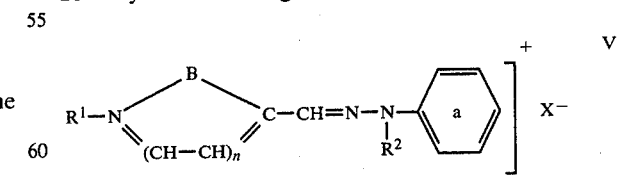   V in which
$R^1$ and $R^2$ represent methyl or ethyl,
n represents 0 or 1,
B represents the divalent radical of a 5-membered or 6-membered heterocyclic ring system and $X^-$ represents an anion, and wherein
the ring a can be substituted by $C_1$- to $C_4$-alkyl radicals, $C_1$- to $C_4$-alkoxy radicals or halogen, in particular chlorine or bromine,
by alkylating compounds of the formula $$\left[ (R^1)_{\overline{m}}N \underset{(CH-CH)_n}{\overset{B}{\diagup}} C-CH=N-\underset{H}{N}-\underset{a}{\bigcirc} \right]^{m(+)} \quad m.X^{(-)} \qquad VI$$

wherein
$R^1$, B and n have the same meaning as in formula V,
m represents 0 or 1 and
the ring a can be substituted by $C_1$- to $C_4$-alkyl, $C_1$- to $C_4$-alkoxy or halogen,
or of the formula $$\underset{R^1}{\overset{B}{\diagdown}}C=CH-N=N-\underset{a}{\bigcirc} \qquad VII$$

in which
B and $R^1$ have the same meaning as in formula V and
the ring a can be substituted by $C_1$- to $C_4$- alkyl, $C_1$- to $C_4$-alkoxy or halogen,
with arylsulphonic acid esters of the formula $$R-\underset{}{\bigcirc}-SO_3R^2 \qquad VIII$$

wherein
R represents hydrogen, $C_1$- to $C_4$-alkyl or halogen and
$R^2$ represents methyl or ethyl,
in the presence of water and acid-binding agents at temperatures of 20°–70° C., and, if appropriate, replacing the resulting arylsulphonic acid anion by another anion customary in dyestuff chemistry, for example chloride or acetate.

A particularly valuable group of the dyestuffs which can be prepared by the process according to the invention corresponds to the formula $$\left[ R^1-N\underset{}{\bigcirc} -\text{o- or p-}CH=N-\underset{R^2}{N}-\underset{a}{\bigcirc} \right]^+ \quad A^- \qquad Va$$

wherein
$R^1$ and $R^2$ have the same meaning as in formula V,
$A^-$ represents $$\underset{R}{\bigcirc}-SO_3^-$$

and the benzene ring a can be substituted by $C_1$- to $C_4$-alkyl, $C_1$- to $C_4$-alkoxy or halogen.

the preparation is effected by reacting compounds of the general formula $$\left[ (R^1)_{\overline{m}}N\underset{}{\bigcirc}-\text{o- or p-}CH=N-\underset{H}{N}-\underset{a}{\bigcirc} \right]^{m(+)} \quad m.A^{(-)} \qquad VIa$$

wherein
$R^1$, X and m have the same meaning as in formula VI and
the benzene ring a can be substituted by $C_1$- to $C_4$-alkyl, $C_1$- to $C_4$-alkoxy or halogen,
with arylsulphonic acid esters of the formula VIII in the presence of water and acid-binding agents, at temperatures of 20°–70° C.

A further particularly valuable group of dyestuffs which can be prepared by the process according to the invention corresponds to the formula $$\left[ (R^3)_z-\underset{\underset{R^1}{N}}{\bigcirc}\overset{CH_3}{\underset{}{\diagdown}}\overset{CH_3}{\diagup}\overset{R^2}{\underset{}{}}CH=N-\underset{}{N}-\underset{a}{\bigcirc} \right]^+ \quad A^- \qquad Vb$$

wherein
$R^1$ and $R^2$ have the same meaning as in formula V,
$R^3$ represents hydrogen, halogen, alkyl, aralkyl, alkoxy, aralkoxy, alkylsulphonyl or carbalkoxy, z denotes 1 or 2,
$A^-$ denotes $$\underset{R}{\bigcirc}-SO_3^-$$

and the benzene ring a can be substituted by $C_1$- to $C_4$-alkyl, $C_1$- to $C_4$-alkoxy or halogen. $R^3$ preferably represents hydrogen, chlorine, bromine, $C_1$- to $C_4$-alkyl, benzyl, $C_1$- to $C_4$-alkoxy, benzyloxy, $C_1$- to $C_4$-alkylsulphonyl, carbomethoxy or carbethoxy.

The preparation is effected by reacting compounds of the formula

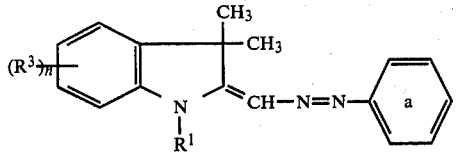

wherein
$R^1$, $R^3$ and z have the same meaning as in formula Vb and
the benzene ring a can be substituted by $C_1$- to $C_4$-alkyl, $C_1$- to $C_4$-alkoxy or halogen,
with arylsulphonic acid esters of the formula VIII in the presence of water and acid-binding agents, at temperatures of 20°–70° C.

A third particularly valuable group of dyestuffs which can be prepared by the process according to the invention corresponds to the general formula

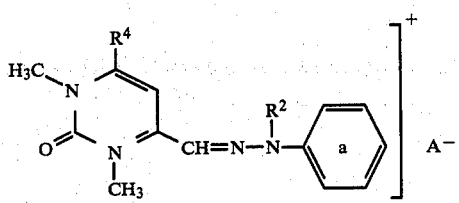

in which
$R^2$ represents methyl or ethyl,
$R^4$ represents hydrogen, methyl or phenyl,
A represents the anion of an arylsulphonic acid and the benzene ring a can be substituted by $C_1$- to $C_4$-alkyl, $C_1$- to $C_4$-alkoxy or halogen.

The preparation is effected by reacting compounds of the formula

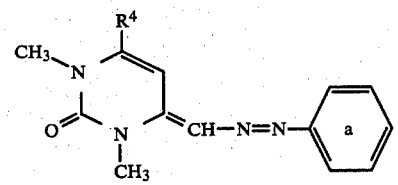

wherein
$R^4$ has the same meaning as in formula Vc and the benzene ring a can be substituted by $C_1$- to $C_4$-alkyl, $C_1$- to $C_4$-alkoxy or halogen,
with arylsulphonic acid esters of the formula VIII in the presence of water and acid-binding agents, at temperatures of 20°–70° C.

A fourth valuable group of dyestuffs which can be prepared by the process according to the invention corresponds to the general formula

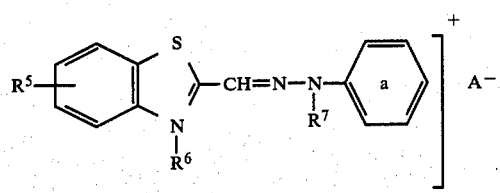

wherein $R^6$ and $R^7$ represents methyl or ethyl,
$R^5$ represents hydrogen, $C_1$- to $C_4$-alkyl, $C_1$- to $C_4$-alkoxy or halogen,
$A^-$ represents

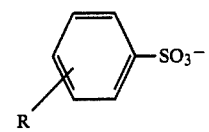

and the benzene ring a can be substituted by $C_1$- to $C_4$-alkyl, $C_1$- to $C_4$-alkoxy or halogen.

The preparation is effected by reacting compounds of the general formula

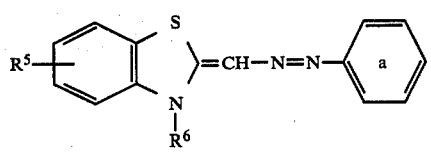

in which
$R^5$ and $R^6$ have the same meaning as in formula IX and
the benzene ring a can be substituted by $C_1$- to $C_4$-alkyl, $C_1$- to $C_4$-alkoxy or halogen,
with arylsulphonic acid esters of the formula VIII at a temperature of 20°–70° C., in an aqueous medium and in the presence of acid-binding agents.

Suitable starting compounds of the formula VI are described in German Patent Specifications No. 1,133,054 and 1,150,475.

Compounds of the formula VII which are suitable starting materials for the process according to the invention are described in the following Patent Specifications: German Patent Specifications No. 1,083,000 and 1,233,520, German Offenlegungsschriften (German Published Specifications) Nos. 2,031,202, 2,039,492, 2,040,872, 2,211,958, 2,452,321, 2,502,024, 2,630,233, 2,732,384 and 2,826,300, British Patent Specifications Nos. 1,186,745, 1,257,652 and 1,512,753 and Japanese Patent Specifications Nos. 49 18 916, 49 42 722, 49 75 646, 50 10 322, 72 24 452 and 77 47 065.

Suitable arylsulphonic acid esters of the formula VIII are: benzenesulphonic acid methyl ester, benzenesulphonic acid ethyl ester, 4-methyl-benzenesulphonic acid methyl ester, 4-methyl-benzenesulphonic acid ethyl ester, 2-methyl-benzenesulphonic acid methyl ester, 4-chloro-benzenesulphonic acid methyl ester and 3-chloro-benzenesulphonic acid methyl ester.

Suitable acid-binding agents are magnesium oxide, magnesium carbonate, sodium bicarbonate, potassium bicarbonate, lithium hydroxide, zinc oxide, sodium hydroxide, potassium hydroxide, sodium carbonate and potassium carbonate. If sodium hydroxide, potassium hydroxide, sodium carbonate or potassium carbonate is used, it is advantageous to utilise a metering device, the feed of which is controlled by a pH meter.

The hydrazone dyestuffs are obtained in a very pure form by the process according to the invention. The entire reaction batch can thus be evaporated to dryness or worked up via a spray-drier. The sodium salt of the arylsulphonic acid, formed as a by-product, then remains in the dyestuff preparation as a formulating agent. This procedure has the particular advantage that no effluent is obtained in the preparation of the dyestuff. The dyestuffs thus obtained dye polyacrylonitrile materials in greenish-tinged yellow to golden yellow colour shades with outstanding fastness properties.

EXAMPLE 1

24.5 g of pyridine-4-aldehyde phenylhydrazone are suspended in 250 ml of water at 20° C. 23.5 g of benzenesulphonic acid methyl ester are added dropwise and the pH value is kept between 7 and 9 by adding 5% strength sodium hydroxide solution; the temperature should not rise above 25° C. After stirring the mixture for 4 hours under the conditions indicated, a further 23.5 g of benzenesulphonic acid methyl ester are added and 25 g of 30% strength sodium hydroxide solution are introduced into the mixture. The mixture is stirred at a temperature of 20° to 25° C. for 18 hours, the pH is then adjusted to 4-5 by means of concentrated hydrochloric acid and the mixture is warmed to 80° C. for 2 hours, the pH being kept between 4 and 5 by adding, if necessary, 5% strength sodium hydroxide solution. After concentrating the mixture in vacuo, the dyestuff of the formula

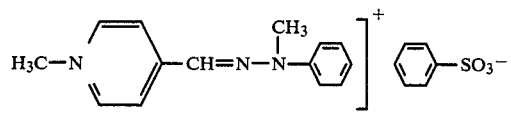

mixed with sodium benzenesulphonate, is obtained as a light yellow powder.

EXAMPLE 2

20 g of pyridine-4-aldehyde (4-chloro-phenyl)hydrazone are suspended in 250 ml of water at 20° C. 16.3 g of benzenesulphonic acid methyl ester are added dropwise and the pH value is kept between 7 and 9 by adding 5% strength sodium hydroxide solution. The reddish suspension is stirred at 20°-25° C. for 4 hours, a further 16.3 g of benzenesulphonic acid methyl ester are added, and 17.4 g of 30% strength sodium hydroxide solution are introduced into the resulting mixture. After stirring the mixture at 20°-25° C. for 18 hours, an orange-coloured suspension is obtained and is adjusted to a pH value between 4 and 5 by means of concentrated hydrochloric acid. The reaction batch is heated to 80° C. at this pH value for 2 hours and evaporated to dryness in vacuo. The dyestuff of the formula

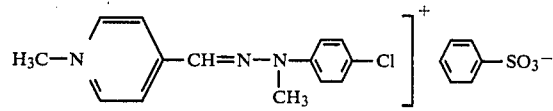

mixed with sodium benzenesulphonate, is obtained.

EXAMPLE 3

20 g of pyridine-4-aldehyde (4-methyl-phenyl)hydrazone are suspended in 250 ml of water, 17.9 g of benzenesulphonic acid methyl ester are added dropwise and the mixture is stirred at 20°-25° C. for 4 hours, the pH value being kept between 7 and 9 by occasionally adding 5% strength sodium hydroxide solution. A further 17.9 g of benzenesulphonic acid methyl ester are then added, 19.1 g of 30% strength sodium hydroxide solution are introduced into the mixture and the mixture is stirred at a temperature between 20° and 25° C. for 18 hours. The pH value is adjusted to 4-5 with concentrated hydrochloric acid, the mixture is heated to 80° C. for 2 hours, whilst maintaining this pH range, and the entire batch is concentrated to dryness under reduced pressure. The dyestuff of the formula

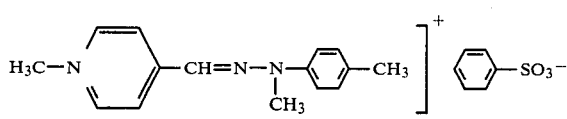

mixed with sodium benzenesulphonate, is thus obtained.

If equimolar amounts of 4-toluenesulphonic acid methyl ester or 4-chloro-benzenesulphonic acid methyl ester are employed instead of the benzenesulphonic acid methyl ester, the corresponding dyestuff salts, mixed with the sodium salts of the corresponding arylsulphonic acids, are obtained.

EXAMPLE 4

12.3 g of pyridine-4-aldehyde phenylhydrazone are suspended in 125 ml of water. 13.9 g of benzenesulphonic acid ethyl ester are added dropwise at 40° C., whilst stirring, and the mixture is kept at this temperature for 15 hours, the pH value being kept between 7 and 9 by occasionally adding 5% strength sodium hydroxide solution. A further 24.2 g of benzenesulphonic acid ethyl ester are added to the emulsion formed and the pH value is adjusted to 13 with 30% strength sodium hydroxide solution. After stirring the mixture at 40° C. and at a pH value of 12.5-13 for 18 hours, the reaction has ended. The pH is brought to 4-5 by means of concentrated hydrochloric acid and the mixture is warmed to 80° C. for 2 hours and evaporated to dryness under reduced pressure. The dyestuff of the formula

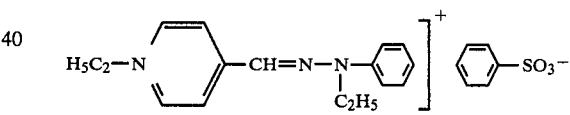

mixed with sodium benzenesulphonate, is thus obtained.

If equimolar amounts of 4-toluenesulphonic acid ethyl ester, 4-chloro-benzenesulphonic acid ethyl ester or 3-chloro-benzenesulphonic acid ethyl ester are used instead of the benzenesulphonic acid ethyl ester, the corresponding dyestuff salts, mixed with the sodium salts of the corresponding arylsulphonic acids, are obtained.

EXAMPLE 5

10 g of pyridine-2-aldehyde phenylhydrazone are introduced into 100 ml of water. 10.4 g of benzenesulphonic acid methyl ester are added dropwise at 40° C., the pH value is adjusted to 7-9 with the aid of 5% strength sodium hydroxide solution and the mixture is kept under these reaction conditions for 15 hours. The reaction is brought to completion by adding a further 18.2 g of benzenesulphonic acid methyl ester, adjusting the pH value to 13 with 30% strength sodium hydroxide solution and stirring the mixture at a pH of 12.5-13 and at a temperature of 40° C. for 18 hours. The pH is adjusted to 4-5 with concentrated hydrochloric acid and the reaction mixture is warmed to 80° C. for 2 hours, whilst maintaining a pH range of 4-5, and then evaporating to dryness in vacuo. The dyestuff of the formula

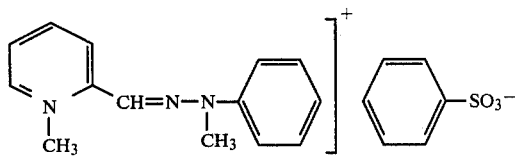

mixed with sodium benzenesulphonate, is obtained.

EXAMPLE 6

38.0 g of benzenesulphonic acid methyl ester are initially introduced into the reaction vessel and 81.2 g of an azo base which has a solids content of 30.7 g and has been obtained by coupling diazotised 4-anisidine to 1,3,3-trimethyl-2-methylene-indoline and rendering the mixture alkaline with sodium hydroxide solution are added. The thixotropic paste is first formed. The reaction mixture is now warmed to 55° C. After 20–25 minutes, the pH value starts to fall and the reaction mixture becomes mobile and stirrable. The pH is kept constantly at 7 by dropwise addition of 10% strength sodium hydroxide solution. A metering device with a solenoid valve controlled by a pH meter is used for this. After stirring the mixture at 55° C. for 23 hours, only traces of the azo colour bases, that is to say the precursor, can still be detected in the thin layer chromatogram. 37 ml of 10% strength sodium hydroxide solution have been consumed for regulating the pH. The pH is now adjusted to 5 by adding 1–5 ml of 10% strength hydrochloric acid and the hot melt is transferred to a rotary evaporator. The melt is evaporated in vacuo in the rotary evaporator at 70° C. and 66.7 g of the dyestuff of the formula

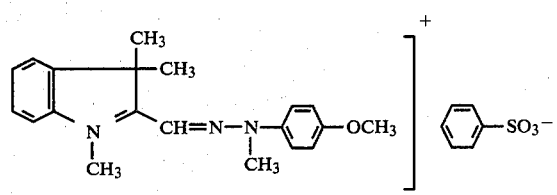

mixed with sodium benzenesulphonate, are obtained.

If the equimolar amount of the azo bases obtained from 4-anisidine and 1,3,3,5-tetramethyl-2-methylene-indoline, 5-chloro-1,3,3-trimethyl-2-methylene-indoline, 5-methoxy-1,3,3-trimethyl-2-methylene-indoline or 5-methoxy-7-chloro-1,3,3-trimethyl-2-methylene-indoline are employed instead of the azo base obtained from 4-anisidine and 1,3,3-trimethyl-2-methyleneindoline and the procedure followed is otherwise identical, valuable dyestuff preparations are likewise obtained.

EXAMPLE 7

37.2 g of benzenesulphonic acid methyl ester are initially introduced into the reaction vessel and 0.45 mol of the moist azo coupling product of diazotised aniline and 1,3,3-trimethyl-2-methylene-indoline, with a water content of 60%, is added at 20°–25° C. The readily stirrable suspension is warmed to 55° C. The suspension is stirred at this temperature for 24 hours and the pH value is kept between 7 and 8 by occasionally adding 5% strength sodium hydroxide solution. Thereafter, the pH value is adjusted to 4–5 and the mixture is warmed to 80° C. for 2 hours. Concentration of the entire batch to dryness under reduced pressure gives the dyestuff of the formula

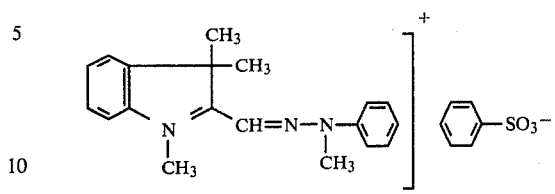

mixed with sodium benzenesulphonate.

If, instead of the azo base obtained from aniline and 1,3,3-trimethyl-2-methylene-indoline, the corresponding azo bases obtained from aniline and 1,3,3,5-tetramethyl-2-methylene-indoline, 5-chloro-1,3,3-trimethyl-2-methylene-indoline, 5-methoxy-1,3,3-trimethyl-2-methylene-indoline, 5-benzyloxy-1,3,3-trimethyl-2-methylene-indoline, 5-phenoxy-1,3,3-trimethyl-2-methylene-indoline, 7-methoxy-1,3,3-trimethyl-2-methylene-indoline or 7-ethoxy-1,3,3-trimethyl-2-methylene-indoline are employed and the procedure is otherwise identical, valuable dyestuff preparations are likewise obtained.

EXAMPLE 8

30 g of the moist azo coupling product obtained from 3-chloro-4-methoxy-aniline and 1,3,3-trimethyl-2-methylene-indoline, with a water content of 50%, are introduced into 21.2 g of benzenesulphonic acid methyl ester. After warming the mixture to 55° C. and adjusting the pH value to 7–9 with 5% strength sodium hydroxide solution, the mixture is stirred in this pH range and at the temperature indicated for 30 hours, the pH is then adjusted to 4–5 with hydrochloric acid and the mixture is heated to 80° C. for 2 hours. It is then concentrated to dryness in vacuo. The dyestuff of the formula

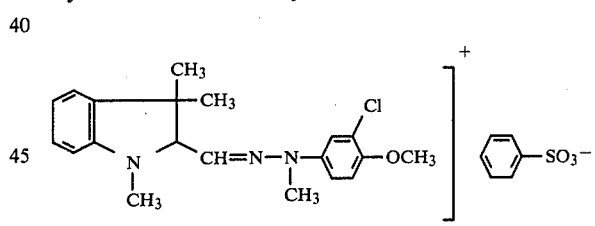

mixed with sodium benzenesulphonate, is obtained.

If the colour bases obtained from diazotised 3-chloro-4-methoxy-aniline and 1,3,3,5-tetramethyl-2-methylene-indoline, 5-methoxy-1,3,3-trimethyl-2-methylene-indoline, 5-ethoxy-1,3,3-trimethyl-2-methylene-indoline and 5,7-dimethoxy-1,3,3-trimethyl-2-methylene-indoline are used instead of the azo coupling product employed here and the procedure is otherwise identical, valuable dyestuff preparations are likewise obtained.

EXAMPLE 9

34.8 g of the moist azo coupling product obtained from diazotised 2-anisidine and 1,3,3-trimethyl-2-methylene-indoline, with a water content of 57.5%, are introduced into 23.6 g of benzenesulphonic acid methyl ester. The mixture is warmed to 55° C. for a total of 20 hours, whilst stirring, the pH value being kept between 7 and 9 with 5% strength sodium hydroxide solution. After acidification, the mixture is heated to 80° C. at pH 4–5 for 2 hours. It is concentrated to dryness under reduced pressure and the dyestuff of the formula

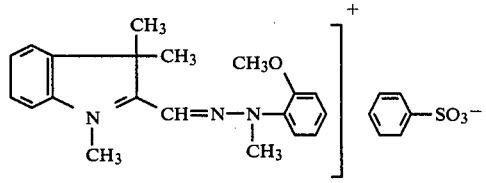

mixed with sodium benzenesulphonate, is obtained.

If the colour bases obtained from diazotised 2-anisidine and 5-benzyl-1,3,3-trimethyl-2-methylene-indoline, 5,7-dichloro-1,3,3-trimethyl-2-methylene-indoline, 5-bromo-1,3,3-trimethyl-2-methylene-indoline, 5-methylsulphonyl-1,3,3-trimethyl-2-methylene-indoline, 1,3,3-trimethyl-2-methylene-indoline-5-carboxylic acid methyl ester or 1,3,3-trimethyl-2-methylene-indoline-5-carboxylic acid ethyl ester are used instead of the azo coupling product employed here and the procedure is otherwise identical, valuable dyestuffs are likewise obtained.

EXAMPLE 10

38.2 g of benzenesulphonic acid methyl ester are initially introduced into the reaction vessel and 100 g of the moist azo coupling product obtained from diazotized aniline and 1,3,6-trimethyl-4-methylene-pyrimid-2-one are added. The mixture is warmed to 50°–55° C., stirred at this temperature and at a pH value of 7–9, which is established with 5% strength sodium hydroxide solution, for 19 hours and then heated to 80° C. for 2 hours at a pH of 4–5, which is established by means of hydrochloric acid. Thereafter, the entire reaction batch is evaporated to dryness under reduced pressure and powdered and the dyestuff of the formula

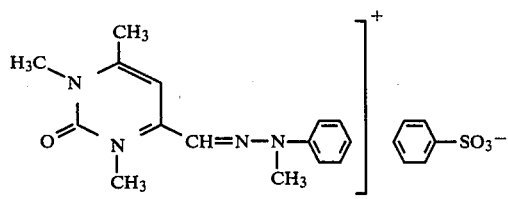

mixed with sodium benzenesulphonate, is obtained.

If equimolar amounts of the azo bases obtained from diazotised 4-toluidine, 4-anisidine, 4-phenetidine, 4-chloro-aniline or 4-methoxy-3-chloro-aniline and 1,3,6-trimethyl-4-methylene-pyrimid-2-one are employed instead of the colour base used in this example and the procedure is otherwise identical, valuable dyestuff preparations are likewise obtained.

EXAMPLE 11

13.9 g of benzenesulphonic acid methyl ester are initially introduced into the reaction vessel. A 0.45 molar amount of the moist azo product obtained from 3-methyl-2-methylene-benzthiazole and diazotised p-toluidine, with a water content of 70–85% are added and the mixture is warmed to 50°–55° C., whilst stirring, the pH value being kept between 7 and 9 by adding 5% strength sodium hydroxide solution. After a reaction time of 22 hours, the pH is adjusted back to 4–5, the mixture is warmed to 80° C. at this pH value for 2 hours and concentrated to dryness under reduced pressure, the residue is powdered and the dyestuff of the formula

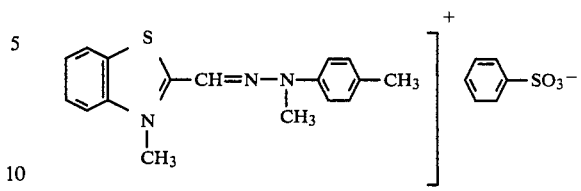

mixed with sodium benzenesulphonate, is obtained.

We claim:

1. A process for the preparation of a dyestuff of the formula

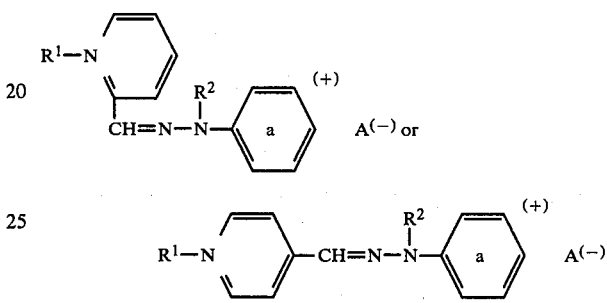

wherein
$R^1$ and $R^2$ are methyl or ethyl,

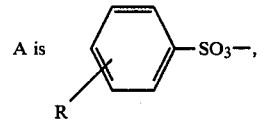

$R$ is hydrogen, $C_{1-4}$-alkyl or halogen, and the benzene ring a can be substituted by $C_{1-4}$-alkyl, $C_{1-4}$-alkoxy or halogen,
comprising reacting a compound of the formula

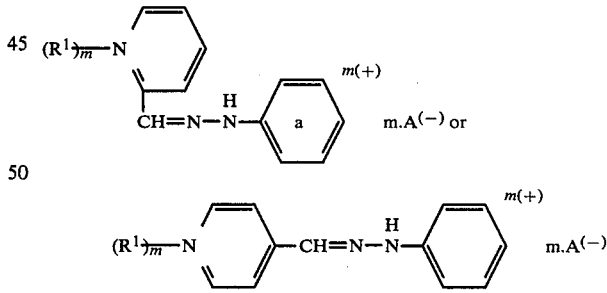

wherein
m is 0 or 1,
with an arylsulphonic acid ester of the formula

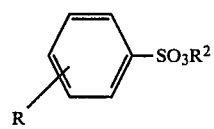

in the presence of water and an acid-binding agent at a temperature of 20°–70° C.

* * * * *